(12) United States Patent
Zhang

(10) Patent No.: US 11,040,890 B2
(45) Date of Patent: Jun. 22, 2021

(54) TANNERY PROCESS WITH EFFLUENT RECYCLING

(71) Applicant: Zhuangdou Zhang, Shangqiu (CN)

(72) Inventor: Zhuangdou Zhang, Shangqiu (CN)

( * ) Notice: Subject to any disclaimer, the term of this patent is extended or adjusted under 35 U.S.C. 154(b) by 0 days.

(21) Appl. No.: 16/708,002

(22) Filed: Dec. 9, 2019

(65) Prior Publication Data
US 2020/0115253 A1    Apr. 16, 2020

Related U.S. Application Data

(60) Continuation of application No. 15/723,146, filed on Oct. 2, 2017, now Pat. No. 10,501,336, which is a
(Continued)

(30) Foreign Application Priority Data

Dec. 23, 2013 (CN) .......................... 201310689868.2
Feb. 17, 2014 (CN) .......................... 201410051333.7

(51) Int. Cl.
*C14C 3/32* (2006.01)
*C02F 1/00* (2006.01)
(Continued)

(52) U.S. Cl.
CPC ............... *C02F 1/004* (2013.01); *C14C 1/04* (2013.01); *C14C 1/08* (2013.01); *C14C 3/06* (2013.01);
(Continued)

(58) Field of Classification Search
CPC ... C02F 1/004; C02F 1/04; C14C 1/08; C14C 3/06
See application file for complete search history.

(56) References Cited

U.S. PATENT DOCUMENTS 3,950,131 A    4/1976  Young
4,457,759 A    7/1984  Fekete et al.
(Continued)

FOREIGN PATENT DOCUMENTS

AU    2014202826    6/2015
AU    2015271965    7/2016
(Continued)

OTHER PUBLICATIONS

Cassano et al.: "Recovery and reuse of chemicals in unhairing, degreasing and chromium tanning processes by membranes", Desalination, Elsevier, Amsterdam, Nl, vol. 113, No. 2-3, Nov. 30, 1997, pp. 251-261.

(Continued)

*Primary Examiner* — Robert A Hopkins

(57) ABSTRACT

A recycling process for achieving near-zero emissions of tannery effluent is characterized in that effluent recycling is carried out independently in soaking, liming, re-liming, de-liming bating, pickling chrome tanning, re-tanning, neutralizing, and dyeing procedures. The effluents in the above procedures can be recycled in each step. This process greatly reduces effluent discharge and helps solve the problem of tanning pollution. The process also improves the quality of the finished leather, effectively decreases loose grain rate and increases compactness and fullness of the finished product. The project can reduce chemical material consumption by 15%-55%. For example, the consumption of chromium powder can be reduced up to 65%. Consumption of other chemical materials can be reduced by more than 90%, while certain chemical materials can be essentially completely conserved.

14 Claims, 1 Drawing Sheet

Related U.S. Application Data division of application No. 14/220,871, filed on Mar. 20, 2014, now Pat. No. 9,776,887.

(51) Int. Cl.

| | | |
|---|---|---|
| C14C 1/04 | (2006.01) | |
| C14C 1/08 | (2006.01) | |
| C14C 3/06 | (2006.01) | |
| C14C 3/22 | (2006.01) | |
| C14C 3/28 | (2006.01) | |
| C14C 9/02 | (2006.01) | |
| C02F 103/24 | (2006.01) | |

(52) U.S. Cl.

CPC ................. *C14C 3/22* (2013.01); *C14C 3/28* (2013.01); *C14C 3/32* (2013.01); *C14C 9/02* (2013.01); *C02F 2103/24* (2013.01); *C02F 2301/046* (2013.01); *Y02A 20/152* (2018.01)

(56) References Cited

U.S. PATENT DOCUMENTS

| | | |
|---|---|---|
| 5,102,422 A | 4/1992 | Christner et al. |
| 2013/0206692 A1 | 8/2013 | Zhang |

FOREIGN PATENT DOCUMENTS

| | | |
|---|---|---|
| CN | 101921881 A | 12/2010 |
| CN | 102120664 A | 7/2011 |
| CN | 102534056 A | 7/2012 |
| CN | 103663765 A | 3/2014 |
| CN | 103833155 A | 6/2014 |
| CN | 104004866 A | 8/2014 |
| CN | 204385217 U | 6/2015 |
| CN | 104988251 A | 10/2015 |
| DE | 4413895 | 10/1995 |
| DE | 19529404 | 2/1997 |
| EP | 0637570 | 2/1995 |
| EP | 2881369 | 6/2015 |
| EP | 3045548 A2 | 7/2016 |
| WO | 2002036497 | 5/2002 |
| WO | 2014169564 | 10/2014 |

OTHER PUBLICATIONS

The World Bank Group, 'Pollution Prevention and Abatement Handbook 1998—Tanning and Leather Finishing', World Bank Publications, Washington, 1999, ISBN 0-8213-3638-X, pp. 404 to 407.

Scholz et al.: "Techno-economic evaluation of membrane filtration for the recovery and re-use of tanning chemicals", Water Research, Elsevier, Amsterdam, Nl, vol. 37, No. 8, Apr. 1, 2003, pp. 1859-1867.

Orts et al.: Tannery Wastewater Recycling in Leather Industries, Project LIFE 00 ENV/E/000498; published Aug. 2, 2003 as per Wayback Machine.

Zhang et al.: "Recycling of Wastewater from Raw Hide to Wet Blues in Leather Manufacture", Congress of the International Union of Leather Technologists & Chemists Societies, Oct. 11, 2009.

First Examination Report dated Jun. 27, 2014 in connection to New Zealand Patent Application No. 626503.

Extended European Search Report dated Sep. 26, 2014 in connection to European Patent Application No. 14002106.4.

Further Examination report dated Jan. 12, 2015 in connection with New Zealand Patent Application No. 626503.

Patent Examination Report No. 1 dated Mar. 19, 2015 in connection with Australian Patent Application No. 2014202826.

Further Examination report dated Jun. 18, 2015 in connection to New Zealand Patent Application No. 626503.

European Office Action dated Jan. 19, 2016 in connection to European Patent Application No. 14002106.4.

Partial European Search Report dated May 24, 2016 in connection with European Patent Application No. 15003637.4.

Patent Examination Report No. 1 dated Aug. 30, 2016 in connection to Australian Patent Application No. 2015271965.

Extended European Search Report dated Sep. 12, 2016 in connection with European Patent Application 15003637.4.

Probiotics as alternatives for synthetic soaking auxiliaries for raw hides and skins in tanneries, https://www.subsport.eu/case-stories/419-en; published Oct. 17, 2016.

Extended European Search Report dated May 2, 2017 in connection to European Application No. 16002435.2.

Office Action dated May 11, 2017 in connection to Australian Application No. 2016259344.

Office Action dated Nov. 9, 2017 in connection to European Application No. 14002106.4.

Examination Report No. 2 dated May 7, 2018 in connection to Australian Application No. 2016259344.

Quizlet, Microbiology Chapter 7 review, https://quizlet.com/52201156/microbiology-chapter-7-review-flash-cards/, accessed Oct. 27, 2018.

Office Action dated Oct. 19, 2018 in connection with Australian application No. 2018203277.

Office Action dated Dec. 10, 2018 in connection with European application No. 15003637.4.

Office Action dated Mar. 21, 2019 in connection with European App. No. 16002435.2.

Examination Report No. 2 dated May 21, 2019 in connection with Australian application No. 2018203277.

Summons to attend oral proceedings dated Jul. 23, 2019 in connection with European App. No. 14002106.4.

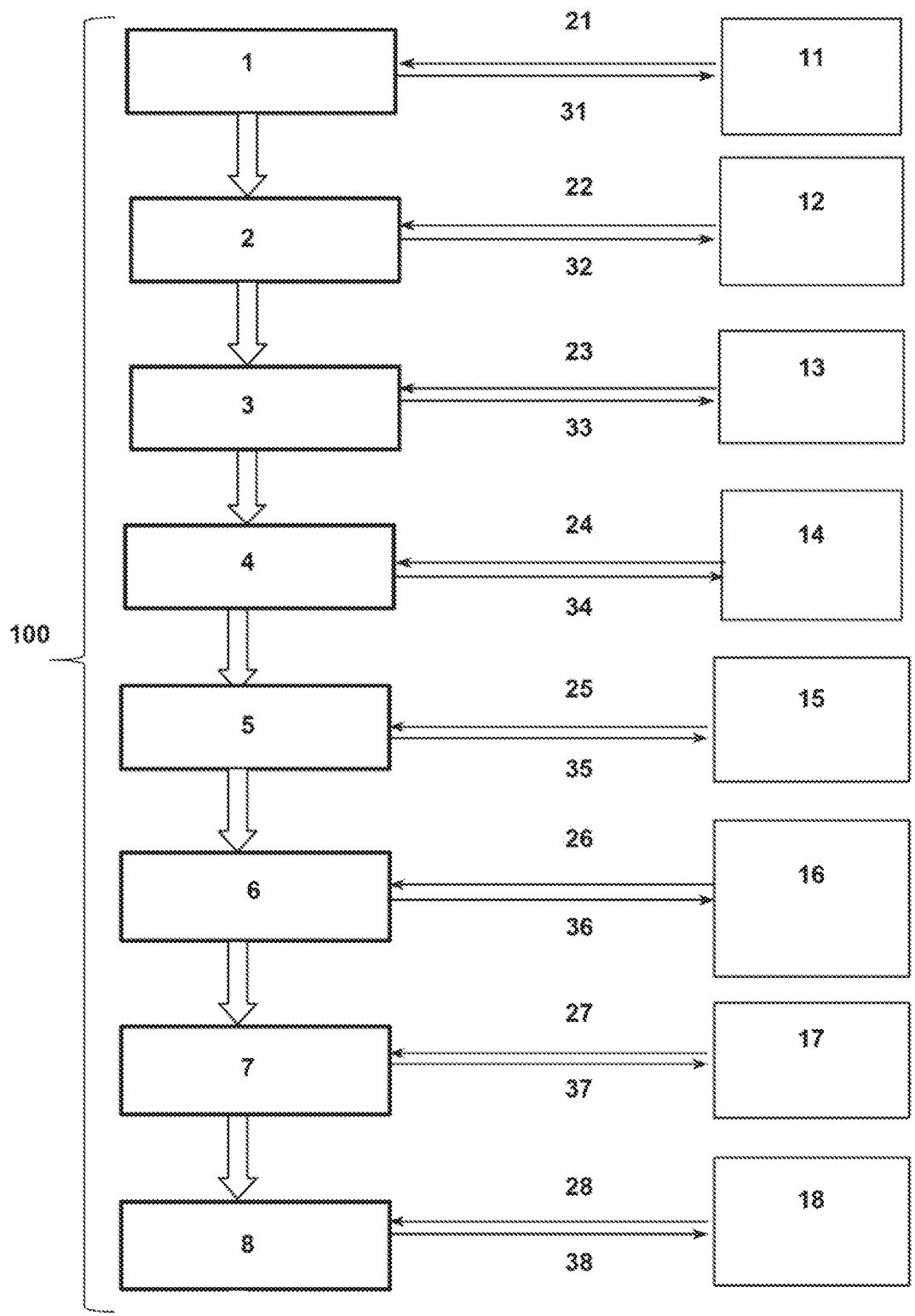

TANNERY PROCESS WITH EFFLUENT RECYCLING

CROSS-REFERENCE TO RELATED APPLICATIONS

This application is a continuation of U.S. patent application Ser. No. 15/723,146 filed on Oct. 2, 2017. The '146 application is a divisional of U.S. patent application Ser. No. 14/220,871 filed on Mar. 20, 2014. The '871 application claimed priority benefits from Chinese Patent Application No. 201310689868.2 filed on Dec. 23, 2013, and from Chinese Patent Application No. 201410051333.7 filed on Feb. 17, 2014. Each of the '871 and '146 applications are hereby incorporated by reference herein in their entireties.

FIELD OF THE INVENTION

The present invention relates to relates to the recycling of effluent emitted from an industrial tanning operation.

BACKGROUND OF THE INVENTION

Large quantities of chemical materials, such as acids, alkalis, salt, sulfides, lime, chrome tanning agents, fat-liquoring agents, and dyes, are used in the tanning process, a considerable part of which flow into the effluents. Tannery effluents mainly come from the preparation process, tanning process, and other wet-processing processes. The discharge of effluents from the soaking to dyeing procedures accounts for more than 90% of the total discharge of effluent from the whole tanning process. These effluents are a complex composition containing large quantities of poisonous and harmful substances, including lime, salts, fat, ammonia and nitrogen-based compounds, protein, sulfides, chromium salt, dyes, hair, hide trimmings, and dirt. The effluents contain very high Biochemical Oxygen Demand (BOD) and Chemical Oxygen Demand (COD) values. Due to the great variety of pollutants involved, the great range in the coefficient of variation for the quality and quantity of water, and their fetid smell, effluents from tanning factories are difficult to treat.

With the development of environmental protection equipment, the technology for treating tannery effluents has advanced (see Table 1). However, the cost of operating the treatment technology is still high and its efficiency is low. As a result, pollution from tannery is still not effectively controlled.

TABLE 1

Current Technology for Treating Tannery Effluent

| Technology | Technical Advantage | Technical Deficiency |
|---|---|---|
| Conventional activated sludge process | Removal Rates: $BOD_5 > 90\%$ $COD \approx 60\%\text{-}80\%$ Chromaticity $\approx 50\%\text{-}90\%$ $S^{2-} \approx 85\%\text{-}98\%$ | Requires a high quality effluent; is not applicable to shock load; require a large amount of power; is expensive to install; requires a large area; not effective at removing ammonia nitrogen |
| Biological contact oxidation process | Removal Rates: $BOD_5 \approx 95\%$ $COD \approx 92\%$ $S^{2-} \approx 98\%$ | Blockages are likely and maintenance is difficult; the entire system must be stopped when performing maintenance. |
| Oxidation ditch | Removal Rates: $BOD_5 > 95\%$ $S^{2-} \approx 99\%\text{-}100\%$ Suspended solids $\approx 75\%$. | The treatment effect is not stable; can only be used in warm weather climates. |
| Bi-layer biofilter | Removal Rates: $BOD_5 \approx 98\%$ $COD \approx 90\%$ $Cr\ (III) > 96\%$ $S^2 \approx 96\%$ Suspended solids $\approx 95\%$ | A suitable reflux ratio needs to be determined; suitable filter materials are required; very expensive. |
| SBR process | Removal Rates: $COD \approx 93.3\%$ $S^{2-} \approx 99.0\%$ $Cr\ (III) \approx 99.4\%$. Suspended solids $\approx 90.3\%$ | Very expensive; can only be deployed at a small scale; its efficiency is low; maintenance is difficult. |

Currently, some companies recycle tannery effluents. However they only recycle effluents using a short procedure (see Table 1), which has a limited effect in reducing the discharge of effluents, the economy of chemical materials, and the reduction of production cost. It is a complicated and difficult problem to recycle all the effluents from of all the procedures associated with the tanning process. Some of the problems associated with the above technologies include: the weight gain rate of limed pelt and the yield of wet-blue drop by 1.5%-3.5%, and the shrinkage temperature drops by 1.5° C.-3.5° C. Furthermore, the above processes will damage the grain side of the wet-blue, making the grain side rough and its color dark. This rougher surface results in the finished leather failing to meet the requirements of some performance indexes.

SUMMARY OF THE INVENTION

The current process performs effluent recycling in procedures from soaking to dyeing. Apart from normal volatilization and unavoidable sifting, the recovery rate of the tannery effluent can reach near 100%, which solves the problem of tannery effluent discharge. Furthermore, the process and equipment is relatively simple and easily applied to existing mass production processes used in tannery.

In one embodiment of the process for recycling tanning effluent, the effluent recycling is carried out independently in the soaking, liming, re-liming, de-limning bating, pickling chrome tanning, re-tanning, neutralizing, and dyeing procedures.

In the above embodiment the effluent is recycled in each of the eight steps: (1) the soaking procedure; (2) the liming procedure; (3) the re-liming procedure; (4) the de-limning bating procedure; (5) the pickling chrome tanning procedure; (6) the re-tanning procedure; (7) the neutralizing procedure; and (8) the dyeing procedure. These steps are discussed in greater detail below.

The recycling of the effluent in the soaking procedure involves: collecting the effluent after each soaking procedure; filtering solid wastes in the effluent; stirring uniformly; putting the effluent into a soaking drum or paddle-tumbler for the next soaking procedure; and detecting the number of microorganisms in the effluent to determine the amount of bactericide to add.

The recycling of the effluent in the liming procedure involves: collecting the effluent after each liming procedure; filtering solid wastes in the effluent; stirring the effluent uniformly; and putting the effluent into a liming drum or paddle-tumbler for the next liming procedure. In the liming procedure, hair can be filtered.

The recycling of the effluent in the re-liming procedure involves: collecting the effluent after each re-liming procedure; filtering solid wastes in the effluent; stirring uniformly; and putting the effluent into a re-limning drum or paddle-tumbler for the next re-liming procedure.

The recycling of the effluent in the de-limning bating procedure involves: collecting the effluent after each de-liming bating procedure; filtering solid wastes in the effluent; stirring uniformly; and putting the effluent into a de-liming bating drum for the next de-liming bating procedure;

The recycling of the effluent in the pickling chrome tanning procedure involves: collecting the effluent after each pickling chrome tanning procedure; filtering solid wastes in the effluent; stirring uniformly; and putting the effluent into a pickling chrome tanning drum for the next pickling chrome tanning procedure.

The recycling of the effluent in the re-tanning procedure involves: collecting the effluent after each re-tanning procedure; filtering solid wastes in the effluent; stirring uniformly; and putting the effluent into a re-tanning drum for the next re-tanning procedure;

The recycling of the effluent in neutralizing procedure involves: collecting the effluent after each neutralizing procedure; filtering solid wastes in the effluent; stirring uniformly; and putting the effluent into a neutralizing drum for the next neutralizing procedure.

The recycling of the effluents in the dyeing procedure involves: collecting the effluent after each dyeing procedure; filtering solid wastes in the effluent; stirring uniformly; and putting the effluent into a dyeing drum for the next dyeing procedure.

In the above procedures, equipment, such as a strainer with a 1 mm-5 mm bore diameter can be used to filter the solid wastes after each procedure. In the above procedures, most, if not all, of the parts of the effluents can be recycled. In other words, in a particular setup, the various procedures can be used alone or in combination with other procedures.

In one embodiment, fleshing and splitting are performed after the soaking and liming procedures, respectively. The effluents produced during fleshing and splitting can be collected in corresponding effluent collecting devices for recycling.

After the soaking, liming, re-liming, de-limning bating, pickling chrome tanning, re-tanning, neutralizing, and dyeing procedures the conventional water washing step can be removed. However, if washing with water is necessary or desired, the effluent produced after water washing also can be recycled.

In general, the soaking effluent can contain, among other things, soaking agent, NaCl, $Na_2CO_3$, degreasing agent, fats and their decomposition products, hair, keratin, mucoprotein, meat, blood. Under normal circumstances, the content of residual degreasing agent in the effluent is usually 15%-30% of its initial amount, the content of soaking agent in the effluent is usually 15%-25% of its initial amount, and the content of $Na_2CO_3$ in effluents is usually 30%-50% of its initial amount.

The effluents in the limning and re-limning procedures can contain, among other things, fats and their decomposition products, salts, lime, a liming agent, $S^{2-}$, $OH^-$, $Na^+$, $Ca^{2+}$, protein and its decomposition products, enzymes and amines. Wherein the content of the residual lime in the effluents is usually 37%-55% of its initial amount, and the content of the residual $Na_2S$ in the limning effluent is usually 2.4 g/l-3.2 g/l.

The de-limning bating effluent can contain, among other things, proteins and their decomposition products, de-liming agent, degreasing agent, fats and their decomposition products, enzymes and ammonium salts, and amines. Wherein the content of the residual enzymes in the effluent is usually 30%-50% of its initial amount, the content of the residual ammonium salts in the effluent is usually 30%-40% of its initial amount.

The chrome tanning effluent can contain, among other things, $Cr^{3+}$, $Cl^-$, $SO_4^{2-}$, proteins and their decomposition products, oils and fat and their decomposition products, etc. Wherein the content of the residual $Cr^{3+}$ is usually 2.8 g/l-3.2 g/l, the content of the residual $Cl^-$ is usually 7 g/l-15 g/l, the content of the residual acid radical in the effluent is usually 30%-45% of its initial amount.

The re-tanning effluent can contain, among other things, $Na^+$, $Cr^{3+}$ and organic tanning agent.

The neutralizing effluent can contain, among other things, neutral salts. Chemical materials such as fat-liquoring agents, dyes and dye assistants are used in the dyeing procedure, except a portion that are absorbed, the vast majority flow into the effluent. These pollutants are macromolecular organic matters, have high concentrations, but have slow biodegradation speed. All the effluents above are normally discharged without disposal. This not only pollutes the environment, but also is a waste of resources.

In some embodiments, the soaking and liming procedures can use the same drum or paddle-tumbler. In these embodiments, the soaking and liming effluents are collected to the collecting device respectively, and the drum or paddle-tumbler is controlled for discharging the effluents into each collecting device by the use of valves.

Specifically, when the soaking and liming procedures use the same drum or paddle-tumbler, a first valve is mounted on the drum or paddle-tumbler for discharging the soaking effluent into a corresponding effluent collecting device, while a second valve is mounted on the drum or paddle-tumbler for discharging the liming effluent into a corresponding effluent collecting device. When discharging the soaking effluent, the first valve is opened, the second is closed, and the effluent is discharged into the corresponding effluent collecting device after passing through a split-flow pipe. When discharging the liming effluent, the second valve is opened, the first valve is closed, and the effluent is discharged into the corresponding effluent collecting device after passing through a split-flow pipe.

Similarly, the de-limning bating and pickling chrome tanning procedures can also use the same drum. The de-liming bating and pickling chrome tanning effluents are collected next to the drum respectively and the drum is controlled for discharging the effluent into each collecting device via valves. Specifically, when the de-liming bating and pickling chrome tanning procedures use the same drum, a third valve is mounted on the drum for discharging the de-liming bating effluent into a corresponding effluent collecting device, while a fourth valve is mounted on the drum for discharging the pickling chrome tanning effluent into a corresponding effluent collecting device. When discharging the de-liming bating effluent, the third valve is opened, the fourth valve is closed, and effluent is discharged into the corresponding effluent collecting device after passing through a split-flow pipe. When discharging the pickling chrome tanning effluent, the third valve is closed, the fourth valve is opened, and the effluent is discharged into the corresponding effluent collecting device after passing through a split-flow pipe.

Similarly, the re-tanning, neutralizing and dyeing procedures can also use the same drum. The re-tanning, neutralizing and dyeing effluents are collected next to the drum respectively and the drum is controlled for discharging effluent into each collecting device via valves. Specifically, when the re-tanning, neutralizing and dyeing procedures use the same drum, a fifth valve is mounted on the drum for discharging the re-tanning effluent into a corresponding effluent collecting device, while a sixth valve is mounted on the drum for discharging the neutralizing effluent into a corresponding effluent collecting device. At the same time, a seventh valve is mounted on the drum for discharging the dyeing effluent into a corresponding effluent collecting device. When discharging the re-tanning effluent, the fifth valve is opened, while the sixth and seventh valves are closed, and effluent is discharged into the corresponding effluent collecting device after passing through a split-flow pipe. When discharging the neutralizing effluent, the sixth valve is opened, the fifth and seventh valves are closed, and the effluent is discharged into the corresponding effluent collecting device after passing through a split-flow pipe. When discharging the dyeing effluent, the fifth and sixth valves are closed, the seventh valve is opened, and the effluent is discharged into the corresponding effluent collecting device after passing through a split-flow pipe.

The above process leads to a reduction of discharge the effluents which helps alleviate the tanning pollution problem as well as save energy. For example, the temperature in the later period of the tanning process is around 28° C.-35° C., 3-10° C. lower than conventional processes.

Furthermore, the finished leather manufactured by the above process has a decreased looseness rate, increased compactness and fullness, and meets the requirements of most performance indexes. Compared with processes using fresh water, after each procedure, the resulting solid waste material is 5%-40% of that produced in process using fresh water, while consumption of chemical materials can be reduced by 15%-55%. In one embodiment, the consumption of chromium powder is reduced by 35%-65%. The consumption of some chemical materials can be reduced by more than 90%, and consumption of certain chemical materials such as salt can be almost entirely eliminated.

BRIEF DESCRIPTION OF THE DRAWINGS

FIG. 1 is a schematic flowchart showing a recycling process being used throughout the tanning process.

DETAILED DESCRIPTION OF EMBODIMENT(S)

FIG. 1 illustrates one setup 100 of a near-zero emission tannery.

Soaking procedure 1 using the soaking effluent involves adding (based on the weight of raw hide and skin) 200% soaking effluent, 0.7% soaking agent, 0.3% degreasing agent, 0.5% sodium carbonate and 0.1% sodium sulfide. The mixture then enters a cycle of running for 40 minutes and standing for 40 minutes. The cycle is repeated three times. Then 0.3% bactericide is added. The mixture is then mixed for 20 minutes and then enters a cycle of running for 3 minutes and standing for 57 minutes. This cycle is repeated overnight before running for 40 minutes the next day.

The effluent is then discharged and filtered 31 into a soaking effluent pool where it is stirred uniformly 11. The effluent is pumped out by an alkali-resistant pump, and returned 21 to soaking drum.

Liming procedure 2 using liming effluent involves adding (based on the weight of raw hide and skin) 70% liming effluent, 1.0% limning assistant, and 0.15% sodium hydrosulfide. The mixture is then mixed for 30 minutes. Then 1.2% lime is added and the mixture is mixed for 30 minutes before being left to stand for 30 minutes. Next, 0.5% sodium hydrosulfide is added and the mixture is mixed for 20 minutes and then left to stand for 20 minutes. The hair is then filtered out and 0.5% sodium sulfide, 0.8% lime and 0.1% degreasing agent are added and the mixture enters a cycle of running for 20 minutes and standing for 30 minutes; this cycle is repeated three times. Next, 20% limning effluent, 0.5% sodium sulfide, 0.5% limning assistant, and 1.0% lime is added and the mixture enters a cycle of running for 20 minutes and standing for 20 minutes; this is repeated 2 times. Then the mixture enters a cycle of mixing for 10 minutes and standing for 20 minutes; this cycle is repeated 6 times. Next, 80% limning effluent is added. The mixture then mixes for 10 minutes, before entering a cycle of running for 5 minutes and standing for 55 minutes; this cycle continues over night.

After liming procedure 2 is completed, or in some cases during the procedure, the effluent is discharged and filtered 32 into effluent pool 12. From effluent pool, the liming effluent is pumped out by an alkali-resistant pump 22 and returned to the liming drum.

Re-liming procedure 3 involves adding (based on the weight of raw hide and skin) 100% re-liming effluent, 0.8% lime, 0.2% sodium sulfide, 0.4% liming assistant, and 0.10% sodium hydroxide. The mixture is mixed for 30 minutes and then left to stand for 40 minutes. Then the process enters a cycle of running for 5 minutes and standing for 55 minutes; this cycle is repeated 6 times. The mixture is then left to sit overnight.

After re-liming procedure 3 is completed, or in some cases during the procedure, the effluent is discharged and filtered 33 into effluent pool 13. From effluent pool, the liming effluent is pumped out by an alkali-resistant pump 23 and returned to the re-liming drum.

De-limning bating procedure 4 involves adding (based on the weight of limed pelt) 100% effluent, 0.2% degreasing agent, 0.6% de-limning agent, 1.2% ammonium sulfate, 0.2% hydrochloric acid, and 0.3% acetic acid. The mixture is mixed for 40 minutes and 0.25% bating enzyme is added. Finally the mixture is mixed for an additional 30 minutes.

After de-limning bating procedure 4 is completed, or in some cases during the procedure, the effluent is discharged and filtered 34 into effluent pool 14. From effluent pool, the de-limning bating effluent is pumped out by an alkali-resistant pump 24 and returned to the de-limning bating drum.

Pickling chrome tanning procedure 5 involves adding (based on the weight of limed pelt) 90% pickling chrome tanning effluent, adjusting the effluent to pH 0.7 by adding sulfuric acid and then adding 0.25% mildew preventive. The mixture is then mixed for 10 minutes and then 0.5% formic acid is added. The mixture is then mixed for an additional 20 minutes before adding 0.3% sulfuric acid for 3 times at 10 minute intervals. The mixture is then mixed for 90 minutes before 0.2% fat-liquoring agent is added. The mixture is then mixed for 30 minutes and allowed to sit 90 minutes before 1.8% chromium powder is added. The mixture is then mixed for 30 minutes and an additional 2.2% chromium powder is added. The mixture is then mixed for 60 minutes and then 0.5% sodium formate is added. The mixture is then mixed for 30 minutes before adding 0.25% basifying agent. The mixture is then mixed for 4 hours before finally adding 80% pickling chrome tanning effluent, heating to 35° C. and mixing for an additional 3 hours.

After pickling chrome tanning procedure 5 is completed, or in some cases during the procedure, the effluent is discharged and filtered 35 into effluent pool 15. From effluent pool, the pickling chrome tanning effluent is pumped out by an acid-resistant pump 25 and returned to the pickling chrome tanning drum.

Re-tanning procedure 6 involves adding (based on the weight of shaved leather) 90% re-tanning effluent, adjusting its pH to 2.5 with sulfuric acid, regulating the mixtures temperature to 36° C. and then adding 0.3% formic acid. The mixture is then mixed for 30 minutes and then 1.5% acrylic acid re-tanning agent is added. The mixture is then mixed for another 30 minutes before 1.0% chromium powder and 0.3% fatliquoring agent are added. The mixture is then mixed 60 minutes and 1.0% fat aldehyde is added. The mixture is then mixed for 30 minutes and 0.8% sodium formate and 0.2% sodium bicarbonate are added before the mixture is mixed another 60 minutes. The process then enters of cycle of running for 10 minutes and standing for 50 minutes; this cycle is repeated 5 times.

After re-tanning procedure 6 is completed, or in some cases during the procedure, the effluent is discharged and filtered 36 into effluent pool 16. From effluent pool, the re-tanning effluent is pumped out by an acid-resistant pump 26 and returned to the re-tanning drum.

Neutralizing procedure 7 involves adding (based on the weight of shaved leather) 200% neutralizing effluent, regulating temperature to 35° C., and then adding 2.0% neutralization tannin and 1.5% sodium formate before the mixture is then mixed for 20 minutes. Next 1.2% sodium bicarbonate and 3.0% fatliquoring agent are added before the mixture is mixed for 60 minutes while the pH value is kept between 4.0 and 6.5.

After neutralizing procedure 7 is completed, or in some cases during the procedure, the effluent is discharged and filtered 37 into effluent pool 17. From effluent pool, the neutralizing effluent is pumped out by an acid-resistant pump 27 back into the neutralizing drum.

Dyeing procedure 8 involves adding (based on the weight of shaved leather) 80% dyeing effluent, regulating the temperature to 30° C., and adding 2.5% acrylic acid re-tanning agent before the mixture is mixed for 20 minutes. Next 4.0% dicyandiamide re-tanning agent, 1.5% wattle extract, and 2.0% sulfited vegetable oil are added before the mixture is mixed for 40 minutes. Finally 2.0% dye and 1.5% composite fatliquoring agent are added before the mixture is mixed for 60 minutes.

After dyeing procedure 8 is completed, or in some cases during the procedure, the effluent is discharged and filtered 38 into effluent pool 18. From effluent pool, the dyeing effluent is pumped out by an acid-resistant pump 28 back into the dyeing drum.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A process for achieving near-zero emissions of tannery effluent, the process comprising the step of recycling an effluent in a soaking procedure, wherein said recycling of said soaking procedure effluent comprises:
   (a) collecting said soaking procedure effluent from a soaking drum into a collection container;
   (b) filtering solid wastes out of said soaking procedure effluent; and
   (c) returning said remaining said soaking procedure effluent, without further chemical treatment to substantially remediate said soaking procedure effluent, to said soaking drum.

2. The process of claim 1, wherein said remaining soaking procedure effluent is uniformly stirred before being returned to said soaking drum.

3. The process of claim 1, wherein said process further comprises
   (c) detecting a number of microorganisms in said soaking procedure effluent to determine an amount of bactericide to add.

4. The process of claim 1 wherein said soaking procedure effluent comprises:
   (i) at least one fat decomposition product; and
   (ii) at least one salt.

5. The process of claim 1 wherein said soaking procedure effluent comprises at least one of NaCl and $Na_2CO_3$.

6. The process of claim 1 wherein said soaking procedure effluent comprises at least one of hair, keratin, mucoprotein, meat, and blood.

7. The process of claim 1, wherein said remaining said soaking procedure effluent is returned to said soaking drum via an alkali-resistant pump.

8. A process for achieving near-zero emissions of tannery effluent, the process comprising the step of recycling an effluent in a re-liming procedure, wherein said recycling of said re-liming procedure effluent comprises:
   (a) collecting said re-liming procedure effluent from a re-liming drum into a collection container;
   (b) filtering solid wastes out of said re-liming procedure effluent; and
   (c) returning said remaining re-liming procedure effluent, without further chemical treatment to substantially remediate said re-liming procedure effluent, to said re-liming drum.

9. The process of claim 8, wherein said remaining re-liming effluent is uniformly stirred before being returned to said re-liming drum.

10. The process of claim 8, wherein said remaining said re-liming procedure effluent is returned to said re-liming drum via an alkali-resistant pump.

11. The process of claim 8, wherein said re-liming procedure effluent comprises:
    (i) at least one fat decomposition product; and
    (ii) at least one salt.

12. The process of claim 8 wherein said re-liming procedure effluent comprises at least one of $S^{2-}$, $OH^-$, $Na^+$ and $Ca^{2+}$.

13. The process of claim 8 wherein said re-liming procedure effluent comprises at least one protein decomposition product.

14. The process of claim 8 wherein said re-liming procedure effluent comprises at least one of enzyme and amine.

* * * * *